Oct. 13, 1925.
G. E. MORRISON
CARBURETOR
Original Filed June 6, 1922
1,556,799
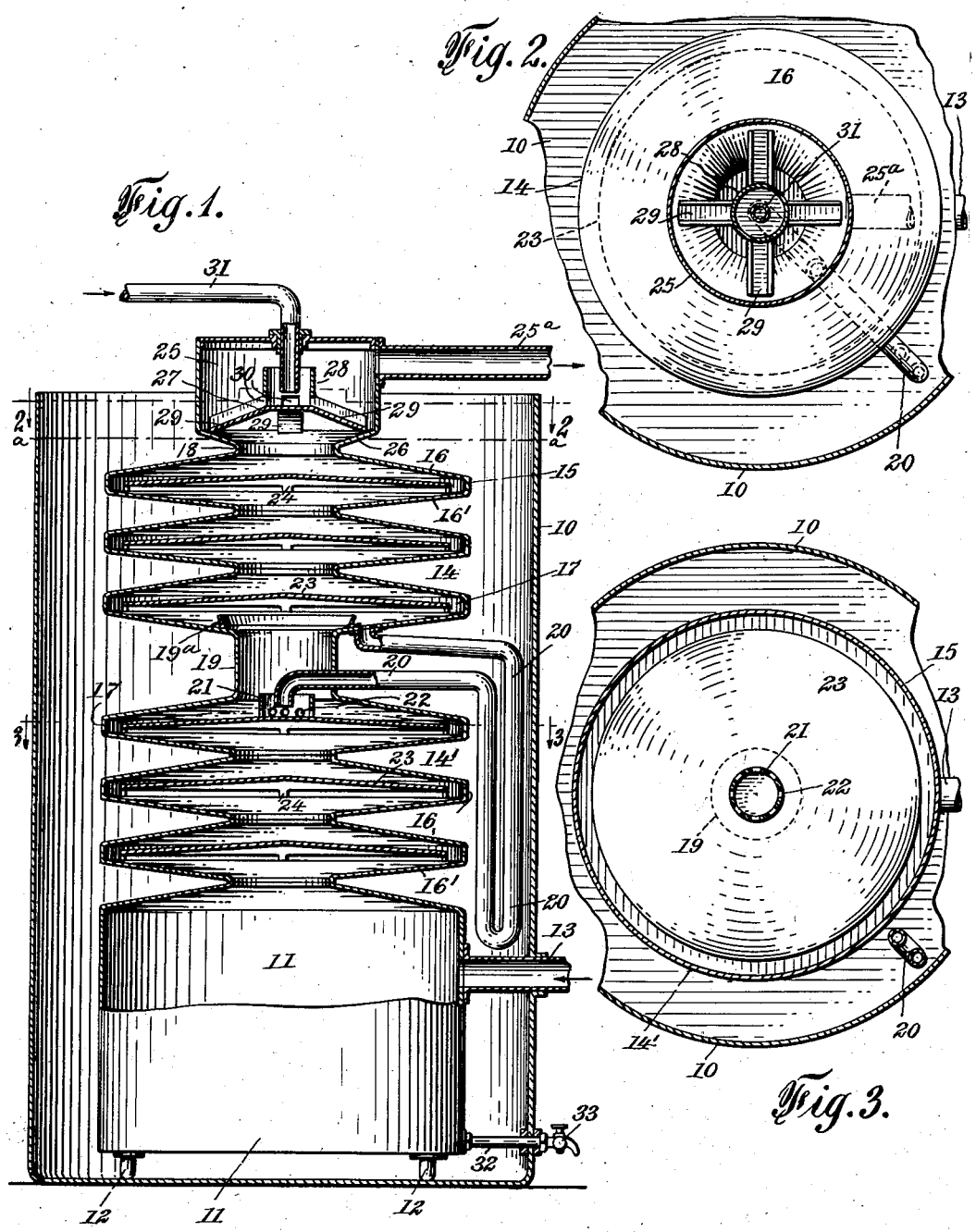
INVENTOR
George Elliott Morrison
BY
his ATTORNEY

Patented Oct. 13, 1925.

1,556,799

UNITED STATES PATENT OFFICE.

GEORGE ELLIOTT MORRISON, OF SAYVILLE, NEW YORK.

CARBURETOR.

Application filed June 6, 1922, Serial No. 566,329. Renewed March 14, 1925.

*To all whom it may concern:*

Be it known that I, GEORGE ELLIOTT MORRISON, a citizen of the United States, residing at Sayville, Suffolk County, in the State of New York, have invented certain new and useful Improvements in Carburetors, of which the following is a full, clear, and exact specification.

My invention relates to improvements in means for vaporizing volatile liquids, and the same has for its object more particularly to provide an apparatus by means of which gasoline, or other volatile liquids may be efficiently vaporized and mixed with air in order to form a combustible gas.

Further, said invention has for its object to provide an apparatus for producing a combustible gas from gasoline or other volatile liquids, to be used more particularly for heating and lighting purposes.

Further, said invention has for its object to provide an apparatus by means of which a uniform temperature may be maintained whereby more efficiently and uniformly to vaporize the volatile liquid.

Further, said invention has for its object to provide an apparatus in which a plurality of communicating parts are disposed within a suitable container or receptacle and surrounded by a fluid whereby the temperature within the vaporizing chambers of the apparatus may be maintained uniformly at any predetermined temperature.

Further, said invention has for its object to provide an apparatus comprising a plurality of parts each composed of a series of connected sections to provide a long travel for the liquid and fluid which is to be converted into a combustible gas.

To the attainment of the aforesaid objects and ends my invention consists in the novel details of construction, and in the combination, connection and arrangement of parts hereinafter more fully described and then pointed out in the claims.

In the accompanying drawings forming part of this specification—

Figure 1 is a central vertical section showing one form of carburetor constructed according to and embodying my said invention;

Fig. 2 is a horizontal section taken essentially on the line 2—2 of Fig. 1; and

Fig. 3 is a similar view taken essentially on the line 3—3 of Fig. 1.

In said drawings, 10 denotes an outer receptacle or casing which is open at its top. Within the outer receptacle or casing 10 is disposed a receptacle 11 supported upon the base of said outer receptacle 10 in slightly elevated position upon feet 12. 13 denotes an air inlet pipe extending through the outer casing 10 adjacent to its lower end and communicating at its inner end with the receptacle 11 adjacent to the top thereof.

14, 14' denote two vaporizing chambers arranged one above the other, and each composed of a series of shallow members 15 of circular outline and having its top 16 and bottom 16' oppositely inclined and connected at their outer ends by a vertical wall portion 17. Within each member 15 is disposed a baffle plate 23 which is dished or inclined from its center outwardly and downwardly and terminates a short distance from the inner side of the wall portions 17 uniting the tops and bottoms of said sections. Each of said baffle plates is provided with short feet or projections 24 which serve to maintain the same in elevated relation with respect to the bottom 16' upon which the same is supported.

Each vaporizing chamber or part 14, 14' is composed of three members 15 which are secured together centrally at their adjacent portions and provided with circular openings 18 therebetween. The chambers or parts 14, 14' are connected together by a tubular portion 19.

20 denotes a pipe having its upper end secured to the bottom of the lowermost section of the upper vaporizing chamber 14, and its other end extending outwardly and downwardly to a point below the lowermost section 15 of the lower vaporizing chamber or part 14', and thence extending upwardly again and inwardly through the tubular portion 19 connecting the vaporizing chamber or parts 14, 14', and having its inner end turned downwardly and extending into a circular baffle 21 provided with openings 22 and secured centrally upon a baffle plate 23.

19ᵃ denotes a circular baffle arranged upon the bottom of the lowermost member 15 of the upper vaporizing chamber 14', and surrounds the opening therein in order to cause the liquid, which has not been vaporized, to enter the upper end of the supplemental connection or pipe 20.

The top 16 of the upper chamber or part 14 is provided with an opening over which is secured a small circular casing 25 having an inwardly inclined bottom 26, and a discharge pipe 25ª, and within said casing 25 is disposed a spider 27 comprising a tubular portion 28 and downwardly and outwardly inclined radial troughs 29 extending therefrom. The lower outer ends of the troughs 29 are suitably secured to the inclined inner surfaces of the bottom 26 of the receptacle 25. The tubular portion 28 of the spider 27 is provided adjacent to its lower edge, in line with each of the troughs 29, with a suitable aperture or apertures 30 through which the gasoline or other liquid to be vaporized may pass out and into the troughs 29 upon being delivered to the tubular portion 28 by a supply pipe 31.

At the base of the inner receptacle 11 is provided a pipe 32 which extends outwardly therefrom and through the outer casing 10, and has its outer end provided with a suitable cock 33.

The operation of the apparatus is as follows: The liquid to be vaporized is received through the pipe 31 and flows into the cup or tubular portion 28 of the spider 27, through the openings 30 therein downwardly through the troughs 29, and thence downwardly upon the inclined upper surface of the bottom 26 of the small casing 25. The liquid thence continues to flow downwardly adhering to the inner sides of the walls of said parts 14, 14' in the form of a thin film which gradually and slowly flows downwardly to the lower vaporizing chamber 14'. Any excess liquid which is not vaporized will be held back by the circular baffle 19ª, and flow into the pipe 20 and upwardly again, and thence into the cup or circular baffle 21 provided upon the upper surface of the baffle plate or disc 23 of the uppermost member 15 of the lower vaporizing chamber 14', and after passing through the apertures 21 therein flow outwardly over the upper surface of the baffle plate 23, and thence downwardly successively through the remaining members 15 of the lower vaporizing chamber or part 14'.

At the same time, air in suitable quantity, will be admitted through the intake pipe 13, and after passing through the receptacle 11 will pass upwardly into the lowermost member of the lower vaporizing chamber, and after striking the under side of the baffle plate 23 will pass over the outer edges thereof and thence into and through the succeeding members of the lower vaporizing chamber 14'. After having passed through the members 15 of the lower vaporizing chamber or part 14', the air will pass through the tubular portion 19 and into the lowermost member 15 of the upper vaporizing chamber or part 14, and thence through said members, in succession, and finally be received in the closed upper receptacle 25, from which it will pass into the discharge or outlet pipe 25ª.

Any condensate or heavy residuum will collect in the lower receptacle 11 from which it may be withdrawn by the cock 33.

It will, of course, be understood that the outer receptacle or casing 10 is filled with water or other liquid to about the height indicated by the reference letter *a*, and may be kept at a suitable or predetermined temperature in order to maintain the temperature within the mixing chambers 14, 14', and receptacle 11 uniform and of such degree as will insure the proper vaporization and mixing of the liquid and fluid passing through the apparatus.

It is to be noted that in the operation of the carburetor, the lighter or more volatile constituents of the liquid will be vaporized in the upper portion of the upper vaporizing chamber 14, while the heavier and less volatile constituents of the liquid will be vaporized in the lower portions of the apparatus, and the whole mixed with the necessary quantity of air in the passage thereof through the vaporizing chamber to form the combustible gas of the character desired.

Further, it is to be noted that in the operation of the carburetor any liquid which has not been vaporized, or which has become cooled in its passage through the upper vaporizing chamber or part 14 will pass into the supplemental connection or pipe 20 (which is immersed in the water) and sufficiently delayed or detained in its travel to cause the temperature of said liquid to attain the degree required to insure its proper vaporization, and the same then slowly delivered into the upper end of the lower vaporizing chamber part 14', and subjected to further vaporization.

Having thus described my said invention what I claim and desire to secure by Letters Patent is:

1. An apparatus of the character described comprising a vaporizing receptacle composed of a plurality of connected parts, and provided with an inlet and an outlet, and means arranged exteriorly of said vaporizing receptacle parts forming a container for receiving and temporarily retaining the unvaporized liquid in contact with a medium for raising its temperature and serving to conduct said liquid from one of said vaporizing receptacle parts to the other of said parts, substantially as specified.

2. An apparatus of the character described comprising a casing, a vaporizing receptacle composed of a plurality of connected parts having an inlet and an outlet, and means arranged exteriorly of said vaporizing receptacle parts but within said casing forming a container for receiving and temporarily retaining the unvaporized liquid in contact with a medium for raising its temperature and serving to conduct said liquid from one of said vaporizing receptacle parts to the other thereof, substantially as specified.

3. An apparatus of the character described comprising a casing, a vaporizing receptacle composed of a plurality of parts having an inlet and an outlet, said parts each consisting of a series of connected elements, means connecting said parts, and means arranged exteriorly of said parts forming a container of relatively small diameter for receiving and temporarily retaining the unvaporized liquid in contact with a medium for raising its temperature and serving to conduct said liquid from one of said vaporizing receptacle parts to the other thereof, substantially as specified.

4. An apparatus of the character described comprising a casing, a vaporizing receptacle composed of a plurality of parts having an inlet and an outlet, said parts each consisting of a series of connected elements, means connecting said parts, and means arranged exteriorly of said parts and connecting one of said vaporizing receptacle parts with the other thereof and forming an extended receptacle for receiving and temporarily retaining the unvaporized liquid in contact with a medium for raising its temperature, and serving to conduct said liquid from one of said parts to the other thereof, substantially as specified.

5. An apparatus of the character described comprising a casing, a vaporizing receptacle composed of a plurality of parts having an inlet and an outlet, said parts each consisting of a series of connected elements, means connecting said parts, and means arranged exteriorly of said vaporizing receptacle parts and extending from the base of one of said parts outwardly and connected to the other of said parts adjacent to the upper end thereof and forming an attenuated receptacle adapted for exposure to a heating medium, substantially as specified.

6. An apparatus of the character described comprising a casing, a vaporizing receptacle therein composed of a plurality of superposed parts having an inlet and an outlet, said parts each consisting of a series of connected shallow elements, means connecting said parts and forming a passage therebetween, and means connecting the bottom of one of said parts with the top of the other of said parts and forming an extended receptacle for receiving and temporarily retaining the liquid remaining unvaporized in one of said vaporizing parts in contact with a medium for raising its temperature and serving to conduct said liquid from one of said parts to the other thereof, substantially as specified.

7. An apparatus of the character described comprising a casing, a vaporizing receptacle therein composed of a plurality of superposed parts having an inlet and an outlet, said parts each consisting of a series of connected shallow elements, means connecting said parts and forming a passage therebetween, and a pipe having one end secured to the bottom of the upper of said vaporizing receptacle parts and its other end carried downwardly below the bottom of the other of said vaporizing receptacle parts and thence upwardly again and connected to the top of said last-named vaporizing part and forming an extended receptacle for receiving and temporarily retaining the liquid remaining unvaporized in one of said vaporizing receptacle parts, in contact with a medium for raising its temperature and conducting the same to the other thereof, substantially as specified.

8. An apparatus of the character described comprising an outer casing, a vaporizing receptacle composed of a plurality of superposed parts having an inlet and an outlet, means connecting said parts and forming a passage therebetween, a receptacle disposed below and communicating with the bottom of the lower-most of said vaporizing receptacle parts, and means arranged exteriorly of said vaporizing receptacle parts and connecting the bottom of the upper of said parts with the top of the lower of said parts and forming an extended receptacle for the fluid remaining unvaporized in one of said vaporizing receptacle parts and conducting said liquid to the other of said parts; said extended receptacle being adapted for exposure to a heating medium whereby to heat said unvaporized liquid in its passage, substantially as specified.

9. An apparatus of the character described comprising an outer casing, a vaporizing receptacle composed of a plurality of superposed parts having an inlet and an outlet, said parts each consisting of a series of connected shallow elements having downwardly and outwardly inclined tops and downwardly and inwardly inclined bottoms, a deflecting plate arranged in each of said parts, a tubular member connecting the series of connected parts with the lower series of connected parts, a receptacle disposed below and communicating with the lower of said vaporizing receptacle parts, and a pipe extending from the bottom of the upper vaporizing receptacle part downwardly within said outer casing to a point below the bottom of the lower vaporizing receptacle part and thence upwardly and inwardly and communicating at its upper end with the top of the lower receptacle part, substantially as specified.

10. An apparatus of the character described comprising an outer casing, a vaporizing receptacle composed of a plurality of parts disposed within said outer casing; said vaporizing receptacle having an inlet pipe extending through said outer casing, a tubular portion connecting said vaporizing receptacle parts, a pipe exteriorly connecting said vaporizing receptacle parts and having a looped portion extending below the said vaporizing receptacles, a receptacle disposed below one of said vaporizing receptacle parts and communicating therewith, a closed receptacle connected to the other of said vaporizing receptacle parts, a fluid supply pipe communicating with said last-named receptacle, and a delivery pipe extending therefrom, substantially as specified.

Signed at the city of New York, in the county and State of New York, this 28th day of April, one thousand nine hundred and twenty-two.

GEORGE ELLIOTT MORRISON.